US008589578B2

(12) United States Patent
Gopalakrishnan et al.

(10) Patent No.: US 8,589,578 B2
(45) Date of Patent: Nov. 19, 2013

(54) STREAMING VIDEO OVER MULTIPLE NETWORK INTERFACES

(75) Inventors: Praveen Gopalakrishnan, Hillsboro, OR (US); Kyriakos Manousakis, New Brunswick, NJ (US); Eric Van Den Berg, Hoboken, NJ (US); David Famolari, Stewartsville, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 1072 days.

(21) Appl. No.: 12/164,058

(22) Filed: Jun. 29, 2008

(65) Prior Publication Data
US 2009/0019505 A1    Jan. 15, 2009

Related U.S. Application Data

(60) Provisional application No. 60/947,190, filed on Jun. 29, 2007.

(51) Int. Cl.
*G06F 15/16*    (2006.01)
(52) U.S. Cl.
USPC ............................ 709/231; 709/203; 709/217
(58) Field of Classification Search
USPC ................. 709/231, 232, 203, 217, 223, 224; 725/109
See application file for complete search history.

(56) References Cited

U.S. PATENT DOCUMENTS

| 6,804,244 | B1   |    | 10/2004 | Anandakumar |         |
|-----------|------|----|---------|-------------|---------|
| 7,117,521 | B2   | *  | 10/2006 | Puthiyedath | 725/107 |
| 7,725,576 | B2   | *  | 5/2010  | Sitaraman et al. | 709/224 |
| 8,417,828 | B2   | *  | 4/2013  | Ma et al.   | 709/231 |
| 2003/0009718 | A1 | * | 1/2003 | Wolfgang et al. | 714/751 |
| 2003/0046032 | A1 | * | 3/2003 | Puthiyedath | 702/188 |
| 2004/0103205 | A1 | * | 5/2004 | Larson et al. | 709/229 |
| 2006/0248213 | A1 | * | 11/2006 | Sherer et al. | 709/231 |
| 2006/0288391 | A1 | * | 12/2006 | Puthiyedath | 725/89 |

FOREIGN PATENT DOCUMENTS

FR        2895181 A      6/2007
JP    2004-350259 A     12/2004

OTHER PUBLICATIONS

Nitin Gogate et al: "Supporting Image and Video Applications in a Multihop Radio Environment Using Path Diversity and Multiple Description Coding" IEEE Transactions on Circuits and Systems for Video Technology, IEEE Service Center, Piscataway, NJ, US, vol. 12, No. 9, Sep. 1, 2002, XP011071869.
El Al A A et al: "Improving interactive video in ad-hoc networks using path diversity" Mobile Ad-Hoc and Sensor Systems, 2004 IEEE International Conference O N Fort Lauderdale, FL, USA Oct. 25-27, 2004, pp. 369-378, XP010765246.

(Continued)

*Primary Examiner* — LaShonda Jacobs
(74) *Attorney, Agent, or Firm* — Westerman, Hattori, Daniels & Adrian, LLP

(57) ABSTRACT

The preferred embodiments provide a system and/or method that exploits the presence of multiple interfaces to provide high quality video streaming (or real time streaming). The proposed solution includes three specific strategies 1) receiver buffer management, 2) selective re-transmission of packets and 3) dynamic load balancing across interfaces to achieve high quality video streaming across multiple interfaces.

24 Claims, 4 Drawing Sheets

(56) References Cited

OTHER PUBLICATIONS

Chen et al: "Robust video streaming over wireless LANs using multiple description transcoding and prioritized retransmission" Journal of Visual Communication and Image Representation, Academic Press, Inc, US, vol. 18, No. 3, May 5, 2007, pp. 191-206, XP022065099.

Nitin Gogate et al: "Supporting Image and Video Applications in a Multihop Radio Environment Using Path Diversity and Multiple Description Coding" IEEE Transactions on Circuits and Systems for Video Technology. IEEE Service Center, Piscataway, NJ, US, vol. 12, No. 9 (Sep. 1, 2002).

El Al A A et al: "Improving Interactive Video in Ad-Hoc Networks Using Path Diversity" Mobile Ad-Hoc and Sensor Systems, 2004 IEEE International Conference O N Fort Lauderdale, FL, USA Oct. 25-27, 2004, Piscataway, NJ, USA, IEEE IS (Oct. 25, 2004).

Chen et al: "Robust Video Streaming Over Wireless LANs Using Multiple Description Transcoding and Prioritized Retransmission" Journal of Visual Communication and Image Representation, Academic Press, Inc, US, vol. 18, No. 3 (May 5, 2007).

Canadian Office Action dated Sep. 28, 2012, issued in corresponding Canadian application No. 2,692,444.

European Office Action dated Feb. 12, 2013, issued in corresponding European Patent Application No. 08 777 926.0 (6 pages).

Japanese Office Action dated Mar. 19, 2013, issued in corresponding Japanese Patent Application No. 2009-554804, with English translation (6 pages).

Japanese Office Action dated May 22, 2012, issued in corresponding Japanese Patent Application No. 2009-554804, (w/Partial English translation, 5 pages).

* cited by examiner

STREAMING VIDEO OVER MULTIPLE NETWORK INTERFACES

BACKGROUND

1. Field of the Invention

The present invention relates to, among other things, providing video streaming over multiple interfaces, and in particular to multiple interfaces to provide high quality video streaming or real time streaming.

2. Background Discussion

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier. IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Video Streaming:

Video streaming over wireless media is a challenging problem. Among other things, this can be a challenge due to the following notable reasons.

First, access bandwidth offered to clients can be highly varying, especially when using wireless networks. Medium characteristics such as interference, and often non-deterministic nature of medium access (802.11 is a prime example), results in highly variable throughputs and delays. Furthermore, the packet networks used in today's world are mostly best-effort in nature, providing no guarantees on bandwidth, delay or packet loss.

Second, the demands on bandwidth and jitter that the video steaming application places can be strict; (typical DVD streaming bandwidth can be up to 9.2 Mbps and jitter needs to be under 200 msec). Moreover the information sources can be non-stationary in nature and the encoding system used often introduces decoding dependencies between packets. This leads to situations where small variability in packet delay (or loss) can lead to significant degradation in the quality of viewing experience.

There has been a need in the art for improvements related to, among other things, video streaming over wireless networks.

SUMMARY

The preferred embodiments of the present invention overcome the above and/or other problems in the background art.

In the preferred embodiments, use is made of the multiple interfaces which we envision will be common in future devices. The present invention relates to an intelligent connectivity framework (present invention system) for exploiting this access diversity, to deliver more bandwidth and QOS for applications. How the multiple interfaces should be made use of depends on the characteristics of the application as well as prevailing network conditions. The present invention system provides a generic, flexible platform for discovering, selecting, executing and evaluating the most appropriate connectivity strategy.

The present invention focuses on a specific set of connectivity strategies to be used within the generic present invention framework, for delivering high quality video streaming between devices. However, the strategies are not limited by the present invention framework, and can be used by either using any similar alternate framework or by itself without requiring an overarching framework.

The set of strategies are under the following categories:
1. Receiver buffer management;
2. Selective re-transmission; and
3. Dynamic load balancing.

In this specification the station (computer) which supplies the video packets is referred to as the sender (server in a client-server architecture) and the station (computer) which receives and then plays-out the video is referred to as the receiver (client).

Buffer management at the receiver station provides re-ordering of packets coming through multiple interfaces and releases packets to the application (video player in this case) in a timely manner.

Selective re-transmission of packets is a mechanism to re-send delayed or lost packets in order that they can still be played-out at the receiver in a timely manner.

In the present method, the video stream is split across the interfaces (packets transmitted over different interfaces). Dynamic load-balancing refers to an intelligent selection of ratios for splitting the video stream across the available interfaces, in a dynamic fashion responding to current network conditions and application characteristics.

The present method further includes replicating at least one packet and transmitting replicates of a packet over different interfaces. Thus, packet splitting includes splitting of sequences packets and transmitting packets over different interfaces as well as replicating at least one packet and transmitting replicates of a packet over different interfaces. Additionally, the method includes the combination of the steps of both splitting of packets and replicating of packets for transmission over multiple interfaces. In one embodiment of the invention the packets from the packet splitting are transmitted simultaneously over multiple interfaces, and in another embodiment, they are transmitted at slightly different times.

The three strategies are independent enough so that any one of them can be used without requiring the use of others. However, it is envisioned that all of them are used together and when used in a manner that helps each other, will result in enhancing the video quality even further.

According to some preferred embodiments, the present invention exploits the presence of multiple interfaces to provide high quality video streaming (or real time streaming). In some embodiments, the proposed solution includes three strategies including 1) receiver buffer management, 2) selective re-transmission of packets and 3) dynamic load balancing across interfaces to achieve high quality video streaming across multiple interfaces.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

Figure 1B:
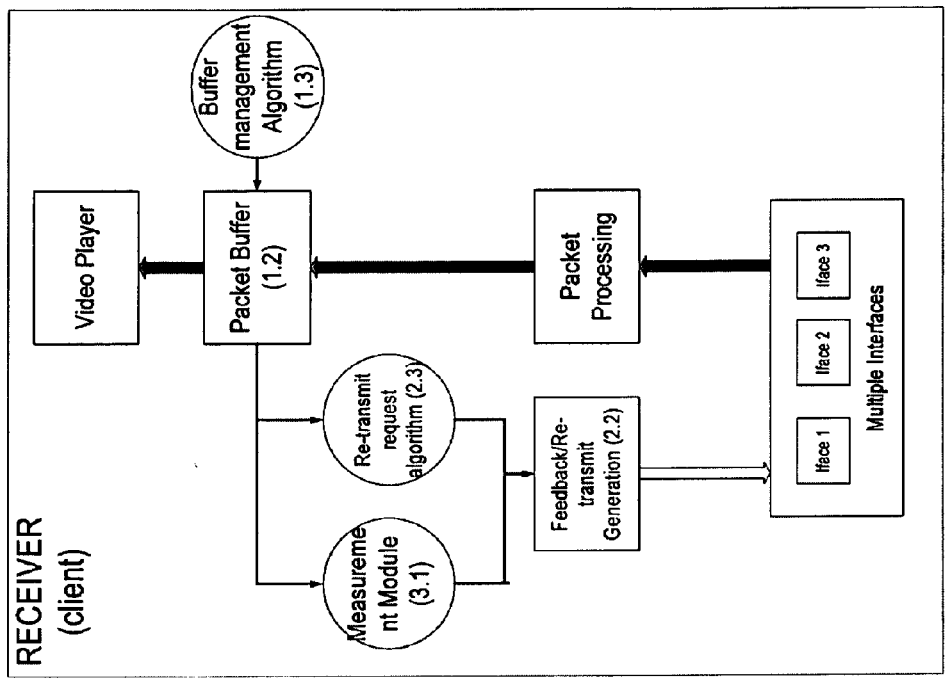
FIG. 1A and FIG. 1B show an illustrative system architecture making use of all three proposed strategies.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Receiver Buffer Management:

Under a system of the preferred embodiments of the present invention framework, packets belonging to a single video stream are transmitted over multiple interfaces. The architecture does not place a restriction on the type of the interface and hence often the interfaces are heterogeneous; that is they vary widely in the capabilities including throughput and delay performance. An important side effect is that of packets arriving out of order at the receiver. Since video streams often use UDP as the transport protocol, there is no entity to guarantee ordered delivery of packets to the end application. Under these circumstances, it is essential to have a buffer at the receiver end to re-order the packets and give them to the application in a timely manner.

Real time application packets (and hence video streaming) have a play-out deadline beyond which the packets are without utility. Hence, not only is ordered delivery of packets to the application important, but times at which the packets delivered to the application is critical. Thus, an intelligent buffer management system is required which takes care of out-of-order packet delivery caused by heterogeneous interfaces, and delivers them to the application in an ordered and timely way.

Play-Out Deadline Based Buffer Management:

Every real-time packet is associated with a play-out deadline. If the packet misses the play-out deadline its utility is lost. Hence the buffering system we use at the receiver should be aware of this play-out deadline in order to supply packets to the target application in a timely manner. Often times, the encoded video packet (ex: MPEG) or the transport protocol headers used to carry the stream such as RTP, will have the play-out deadline of the corresponding packet. By knowing the format of such encoding/protocol headers, and processing such information at the receiver it is possible to determine the play-out deadline for each packet. However, since the framework of the present invention preferentially is protocol/encoding independent, we make use of an alternate method to determine the play-out deadline. This is not a restriction and the present invention framework/algorithms presented can work with any such method. The following assumptions are made for the preferred embodiments of the proposed method:

a) Play-out deadline of each packet is a fixed value (tolerance) from the time at which packets are generated at the sender machine. Furthermore, tolerance time is computed as the time for which the first packet is buffered at the receiver, before being delivered to the target application.

b) There exists local clock synchronization between the sender and receiver machines $$T_{playout} = T_{generation} + T_{tolerance}.$$

The overall method for buffering and releasing of packets based on play-out deadline has the following sub-components:

a) Packet processing (marking, time-stamping) at the sender machine (see 1.1 below);

b) Packet processing (buffering, re-ordering) at the receiver machine (see 1.2 below);

c) Buffer management algorithm to deliver packets from the buffer to the application based on packet play-out deadlines. (see 1.3 below).

Packet Processing at the Sender (1.1):

We make use of the packet processing module of the preferred embodiments of the present invention framework to accomplish this part. Packet processing module at the sender machine receives each packet, adds a custom header to each packet, and based on which interface the packet is destined to go through, modifies the IP headers appropriately. The custom header can be designed to be made specific to application type to accommodate various fields that are applicable. For real-time applications the custom header consists of a locally generated packet id (incremented sequentially), a time field which indicates the local time at which the packet processing module (at the sender machine) receives the packet, and a field indicating the interface over which the packet is sent. A custom header format can be as follows:

1 Packet ID
Packet Generation time
Interface ID

Packet Processing at the Receiver (1.2):

At the receiver machine, there is a packet buffer where all incoming packets are first placed. Using the custom header information, the play-out deadline is computed for each packet using the equation:

$$T_{playout} = T_{generation} + T_{tolerance}$$

The tolerance time is computed based on the time for which the first packet was buffered. Play-out times are not computed till the first packet is delivered to the application. Packets whose play-out deadlines have expired are dropped from the buffer. Similarly, if multiple copies of the same packet are received, only one copy is kept in the buffer and the rest are discarded. The packets are re-ordered (if needed) based on the packet id field, and finally the custom headers are stripped. The packets wait in the buffer till the algorithm (given below) decides to release them to the application.

Buffer Management Algorithm (1.3):

A heuristic algorithm is based on a set of rules/thresholds to trigger the release of packets to the application. Once the decision to release packets is made, a group of packets is delivered to the application. Of course, the present invention system or the implementation thereof is not limited by this algorithm and works with any other such logic. The buffer management algorithm determines the times at which a group of packets are to be released to the application and the number of packets to be released.

Release of Packets:

The following sets of rules/thresholds are made of use of to trigger the release of packets in the current version of the algorithm:

1) The play-out deadline of the packet delivered last is about to expire;
2) Queue length (number of packets) of packet buffer exceeds threshold; and
3) Time since last packet release exceeds threshold.

The second condition is required mostly for implementation specific reasons, and can vary based on the type of operating system/hardware platform used. For the first time (when no packets have been delivered to the application), since play-out deadline cannot be determined, only conditions 2 and 3 are used. Another parameter used in the algorithm is whether the next packet to be delivered (based on packet id) is present in the buffer. This is indicated using the variable: nextPktAvailable. The set of rules is specified more precisely as given below. Here, CurrentTime variable denotes the current time and QueueLength is the current length of the packet buffer. $T_{release}$ denotes the time when the last set of packets were delivered.

$\text{CurrentTime} > T_{playout} - T_{threshold2}$      CONDITION I

OR $\text{QueueLength} > \text{QL threshold2}$      CONDITION II

OR $\text{CurrentTime} > T_{release} - T_{threshold4}$      CONDITION III

OR $((\text{CurrentTime} > T_{playout} - T_{threshold1})$ OR
$(\text{QueueLength} > \text{QL threshold1})$ OR
$(\text{CurrentTime} > T_{release} - T_{threshold3}))$ AND
$(\text{nextPktAvailable} == 1)$      CONDITION IV Conditions I, II, III correspond to the individual rules 1), 2), 3) respectively. Condition IV is a collective rule of each of the conditions along with the condition that the next packet to be delivered is available in the buffer (nextPktAvailable=1). The key is to set appropriate values for the threshold variables:

$$T_{threshold1}, T_{threshold2}, T_{threshold3}, T_{threshold4}, QL_{threshold1}, QL_{threshold2}$$

Maintaining the following sets of relations in threshold value selection are important in ensuring the efficiency of the algorithm.

$$T_{threshold1} >= T_{threshold2}$$

$$T_{threshold3} >= T_{threshold4}$$

$$QL_{threshold1} <= QL_{threshold2}$$

The specific sets of values we use in the current embodiment are:

$$T_{threshold1} = 100 \text{ msec}, T_{threshold2} = 50 \text{ msec},$$

$$T_{threshold3} = 10 \text{ sec}, T_{threshold4} = 5 \text{ sec},$$

$$QL_{threshold1} = 800, QL_{threshold2} = 800$$

Number of Packets to be Released:

Another important system variable is, given the decision to release packets, how many should be released. In the current design we set this as either until the next missing packet or until a given threshold number of packets, whichever is less in terms of number of packets released. The threshold used is QL thresholds where $QL_{threshold3} < QL_{threshold1}$ and we use the value $QL_{threshold3} = 400$ in the current embodiment.

An important feature of the algorithm is that it envisions the threshold values to be set dynamically. Threshold values control how much initial buffering happens and how often packets are released, ultimately defining end user experience. A few parameters that are possible candidates based on which the threshold variables are set can be:

1) Application type/parameters (e.g.: voice, video, gaming, etc.)
2) Transport protocol/parameters;
3) Operating system/hardware platform; and
4) Network conditions.

Selective Re-Transmission of Packets:

Often times, packets transmitted over the network gets delayed (beyond play-out time) or lost due to a variety of impediments in the network. In both cases, the result is that such packets are unavailable to be played-out at the receiver side application. For some real-time applications, especially video, the encoding makes even a single packet loss propagate through multiple packets (decoding dependency). The result is often a significant reduction in the quality of end-user experience. To rely on wireless access or the core IP networks which provide only best-effort service, is surely a recipe for frequent interruptions and pixelations in the video being played. Hence while using such networks, in order to have high quality end-user experience, it is important to have new strategies to reduce the number of lost or delayed packets as much as possible.

Duplicating packets or using other forms of error correction coding is one way to deal with the problem. But it is very common that in wireless networks, the performance (delay, loss) is adequate for most periods of time and packets get delayed/lost only for short bursty periods of time. In such cases, various forms of error correction coding can be inefficient use of the scarce wireless bandwidth, not to mention the resources such as time and memory that it consumes. Selective re-transmissions is a bandwidth efficient and effective method for minimizing the number of delayed/lost packets. Under such a system, the receiver would request the sender to send a selected number of packets (missing ones), and the sender would re-send those packets. Determining when to request the re-transmission of a missing packet is crucial in characterizing the efficiency and effectiveness of the system. The present invention provides a strategy for selective re-transmission of video packets and an algorithm to intelligently request for re-transmission of specific packets.

The strategy consists of the following sub-systems:

a) A mechanism to buffer copies of already sent packets at the sender machine so they can be re-transmitted if needed, and to destroy buffered packets at appropriate times so that the buffer size does not grow unbounded (2.1);

b) A mechanism for the receiver to request specific packets from the sender (2.2);

c) An algorithm to decide when to request for re-sending a missing packet, which is effective in terms of minimizing missing/lost packets and efficient in terms of bandwidth utilization (2.3); and d) A system and algorithm for the sender to determine the most efficient strategy for re-transmit the packet, through one or more interfaces. (2.4)

Sender Side Re-Transmit Buffer (2.1):

When a packet gets sent for the first time, a copy of the packet is made and is stored in a packet buffer at the sender machine. Later when the receiver requests a re-transmission of a particular packet, it can be done using the stored copy in the packet buffer (sender side).

However, buffering of all packets can lead to significant memory requirements. In order to optimize the memory requirements the proposed method makes use of feedback from the receiver machine to determine freeing up of certain packets stored in the sender side buffer. In the current implementation, the receiver periodically feeds back the packet id of the packet up till which all previous packets have been received. The sender then frees up the buffer for all packets up till this packet. This way, the memory consumed by sender side buffering of packets is kept to a minimum value.

Receiver Request for Re-Sending Packets (2.2):

Receiver machine has to inform the sender of its request for the re-transmission of selected packets. In order to minimize the number of re-transmit requests (preserve bandwidth), it is proposed that the re-transmit requests be grouped whenever possible.

The control channel present in the preferred embodiments of the present invention framework is made use of to send a list of packet ids which are requested for re-transmission. Furthermore it is proposed that a way to indicate the urgency of each re-transmission request be present. This could be in the form of an extra field attached to each re-transmit packet id, or else a count of the number of urgency requests belonging to each level followed by an ordered list of packet ids per level. Knowing the urgency level of each re-transmission request could help the sender to have separate re-transmission strategies for each sort of request. Such a mechanism is designed to ensure effectiveness and efficiency of the selective re-transmission method.

As an example assume that there are 2 levels of urgency, URGENT and NORMAL. Urgent level may represent packets that are about to be played out within a given time threshold, and normal ones have play-out deadlines beyond that deadline. The re-transmission message format can have two fields indicating the number of requests belonging to each level, followed by the list or URGENT packets and finally the list of NORMAL packets.

Re-Transmit Request Algorithm (2.3):

The function of this algorithm is to decide when to ask for re-transmission of a missing packet. The re-transmission request has to be made early enough to ensure that re-transmitted packet arrives at the receiver before the play-out deadline of the packet is past. At the same time, due to packets being transmitted across multiple heterogeneous interfaces as well as the unpredictable nature of delays/loss in the wireless network, we need to account for the fact that the packet can be in transit. Requesting an early re-transmission for a packet already in transit can lead to inefficient use of wireless bandwidth. Thus on the one hand, probability of successful packet reception before deadline can be improved with early re-transmission requests, and on the other more wireless bandwidth is consumed by early (and unnecessary) re-transmit requests. It is important to note that the trade off between the two aspects (minimizing loss and maximizing bandwidth efficiency) is often dependent on the nature of the application as well as network characteristics. The proposed selective re-transmission system and the algorithm in particular has parameters to control this trade off based on system requirements and operating conditions.

The specific functions carried out by the algorithm are:

a) Identify packets as potentially 'missing' at appropriate times;

b) Send re-transmission requests at appropriate times; and c) Identify the level of urgency for each missing packet.

As indicated before, in order to conserve bandwidth re-transmission requests are grouped whenever possible. Hence we potentially have two different time instants when a packet is identified as 'missing' and when the actual re-transmission request is made.

A packet (with a given packet id) is deemed as 'missing' when:

a) Play-out deadline of the packet present in the buffer (ordered) immediately before the missing packet (as given by packet ids) falls within a given threshold of time;

b) Difference between the missing packet id and the most recent packet id (largest packet id if packet ids are always increasing) exceeds a threshold.

A re-transmit request can be made when there are 'missing' packets and:

a) Play-out deadline of the last ordered packet is about to expire;

b) A time-out value occurs from when the last re-transmit request was made (periodic re-transmit requests);

c) Total number of missing packets exceeds a given threshold.

Determining the level of urgency of the re-transmit request for a particular packet can be based on:

a) Play-out deadline of the packet present in the buffer (ordered) immediately before the missing packet (as given by packet ids);

b) Total number of missing packets exceeds a given threshold.

In the current implementation, a packet is deemed as missing when the difference between the missing packet id and the most recent packet id (largest packet id if packet ids are always increasing) exceeds 100. Re-transmit requests are made periodically every 0.1 second and Level of urgency of all packets is set to URGENT.

It is important to note that the threshold values to be used in association with play-out deadlines should be dependent on such thresholds presented in the earlier algorithm to determine the trigger for the release of buffered packets to the application.

Re-Transmission Strategy Algorithm (2.4):

Once the sender receives the re-transmission request for a particular packet, it decides on a re-transmission strategy based on the urgency level. The presence of multiple interfaces gives sender the option of re-transmitting through any combinations of interfaces. One such strategy is to re-transmit multiple copies of packets with URGENT level through all available interfaces, and use only one interface to re-transmit NORMAL level packets.

In our current implementation, the strategy used is to re-transmit multiple copies of packets through all interfaces that are determined to be of good quality. Interface quality is measured using experienced end-to-end delays or other channel quality measurements.

Dynamic Load Balancing Across Interfaces:

Given that packets can be sent over multiple available interfaces, the end-to-end packet delays and hence the streaming performance depends on how the stream is split (number of packets per interface) across multiple interfaces. The third and final technique used in conjunction with buffering mechanism and selective re-transmissions is to adaptively vary the amount of packets carried by the available interfaces. Wireless interfaces/networks are known to have widely varying characteristics such as available throughput, delay and loss as a function of time. Variations in channel conditions caused by fading or interference, sudden burst of traffic on the medium caused by other stations using the network, and performance issues of wireless cards/device drivers are some contributors to the uncertainty. In such periods, packets transmitted over the network can get lost or delayed significantly. Hence a transmission strategy that allocates fixed number/ratio of packets to the various interfaces is not will suited for streaming over wireless networks. Key is to adaptively change the allocation strategy based on networking conditions and application characteristics. However the challenge is to monitor the networking conditions and be able to predict the various impediments. Some aspects of network condition, notably the RF characteristics can be obtained by querying with the device driver for that wireless device. But it is noted that there is no common API to query heterogeneous wireless device types, and hence intimate knowledge of the vendor specific device driver used is needed to accomplish this. Monitoring end-to-end delays in the network caused by other stations using the medium or congestion, is very challenging and often done using out-of-band signaling. This operation requires specific protocols as well as the associated networking overhead. Finally, the conditions change very frequently making it necessary to do frequent monitoring at the cost of precious wireless bandwidth.

The present invention provides an effective technique using the spectrum efficiently as well as using as less external protocols/overhead as possible. Furthermore, keeping in line with the present invention philosophy of being device and protocol agnostic, our solution does not use specific knowledge or assumptions about devices or protocols.

The sub-systems involved in the load-balancing system are:

a) Measurement/monitoring system providing current information about networking conditions;

b) Algorithm which determines the percentage of load on each interface, taking into account the current networking conditions and application characteristics.

Measurement/Monitoring System (3.1):

Important aspects of the proposed measurement/monitoring strategy is that it:

a) Uses data stream performance parameters to characterize networking conditions;

b) Uses a combination of in-band signaling and out-band signaling, keeping out-band signaling to a minimum.

It is to be noted that any further measurements/information about networking conditions that are made available through querying the device drivers or other protocols such as 802.21 can readily be put to use. However as observed before, the important feature is that the system does not depend on such information, instead uses data stream performance parameters as the primary source.

We propose the use of end-to-end delay measurement per interface and missing/lost packet per interface, both measured using the on-going data stream to evaluate the transmission strategy. Both these parameters already exist and furthermore are good indicators of effect of current networking conditions. Since the objective is to better the data stream performance parameters (minimize delay, minimize loss), measuring and using the same parameters on a per-network basis as inputs to perform the optimization is a very suitable approach. This is beyond the obvious advantage of not having to monitor and measure other network performance metrics such as signal strength or end-to-end delay using out-of band signaling.

Since each transmitted packet has a field in the custom header indicating the interface through which it was transmitted, on the receiver side keeping track of per interface metrics is possible. For each received packet, the receiver computes the end-to-end delay based on the time-stamp values. Periodically (can also be after a fixed number of packets is received) the receiver determines the average packet delay for each of the interfaces, and feeds back this information using the present invention control channel to the sender machine. As explained in the previous section on selective re-transmissions, the sender when it receives re-transmit requests can also determine the missing/lost packet rate for each of the interfaces.

Algorithm for Dynamic Load-Balancing (3.2):

The sender machine periodically gets feedback on the packet delays and loss rate for each of the interfaces. Using these two metrics (and some others as well), each interface quality is captured as a cost function (range between 0 and 1). The cost function for each interface represents the cost in terms of performance degradation when using the interface. A cost function of 0 represents excellent interface conditions and no loss of quality in using the interface, whereas 1 represents unacceptable quality for packets transmitted over the interface.

One such realization of the cost function as a function of packet delay and loss that we have implemented is given as per table below:

|       |            | Loss Rate (LR) |          |          |
|-------|------------|----------------|----------|----------|
|       | Delay      | 0 to 0.1       | >0.1     | 0        |
| Delay | 0-50 msec  | LR*10          | 1.0      | 0        |
|       | 50-100 msec| Max(LR*10, 0.5)| 1.0      | 0.5      |
|       | >100 msec  | 1.0            | 1.0      | 1.0      |
|       | 0*         | 0.25/1.0       | 0.25/1.0 | 0.25/1.0 |

Cost Function Values

When the average delay is zero, it can be due to several reasons. The sender may not have sent any packets over that interface to the receiver during the interval, or else it could be that the interface quality was so bad that none of the sent packets were received. Another reason is the loss of the packet reporting feedback information. Hence when the delay value is 0, the cost function value is determined based on if any packets were transmitted on that interface during the previous time period; if so the cost function is set to 1, if not the value is 0.25.

Once the cost function per interface is computed, a time average cost function is computed by averaging over previous cost function values as well, as given in the following equation.

$$c_i(t) = \alpha c_i^{CURR} + (1-\alpha)c_i(t-1))$$

Here, the parameter $\alpha$ represents the averaging parameter, $c_i^{CURR}$ is the current value of cost function (computed as given by the table above).

Finally, once the appropriate averaged cost function value is computed for each of the interfaces, a linear combination of the cost functions weighted by the ratio of each interface usage is found. It is this weighted overall cost that serves as the objective function. The algorithm to compute ratios of interface usage (% of packets to be transmitted across a given interface) can be summarized by the following linear programming formulation:

$$\min C = \sum_{i=1}^{N} c_i \cdot r_i$$

subject to the following constraints
$r_i^{MIN} \leq r_i \leq r_i^{MAX}$ for every i
AND $$\sum_{i=1}^{N} r_i = 1$$

It is noted that a wide range of algorithms including minimizing the mean delay and other non-linear algorithms are applicable. The specific algorithm described in the write-up is a representative one which is currently implemented in the test-bed.

Figure 1A:
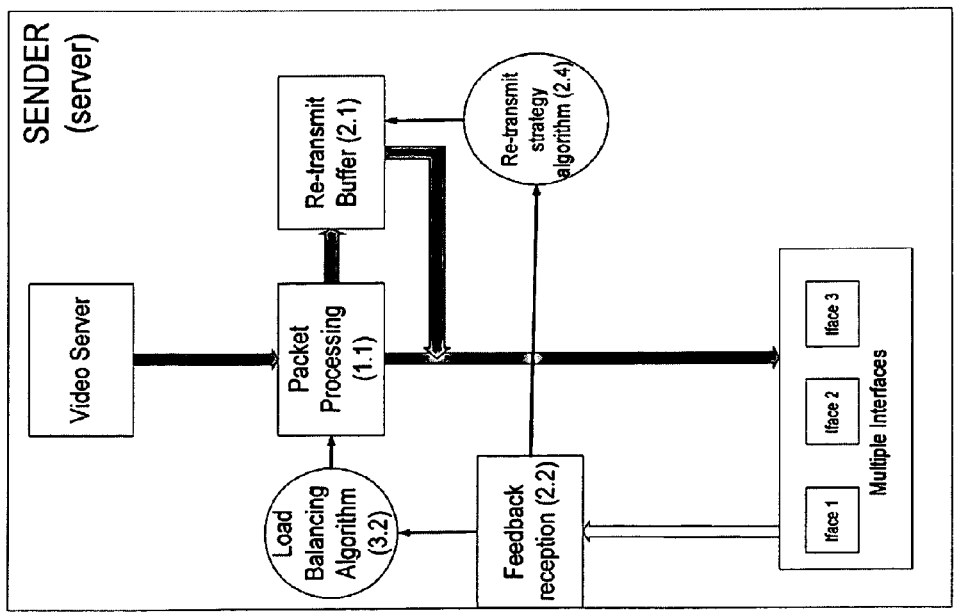
Figure 2:
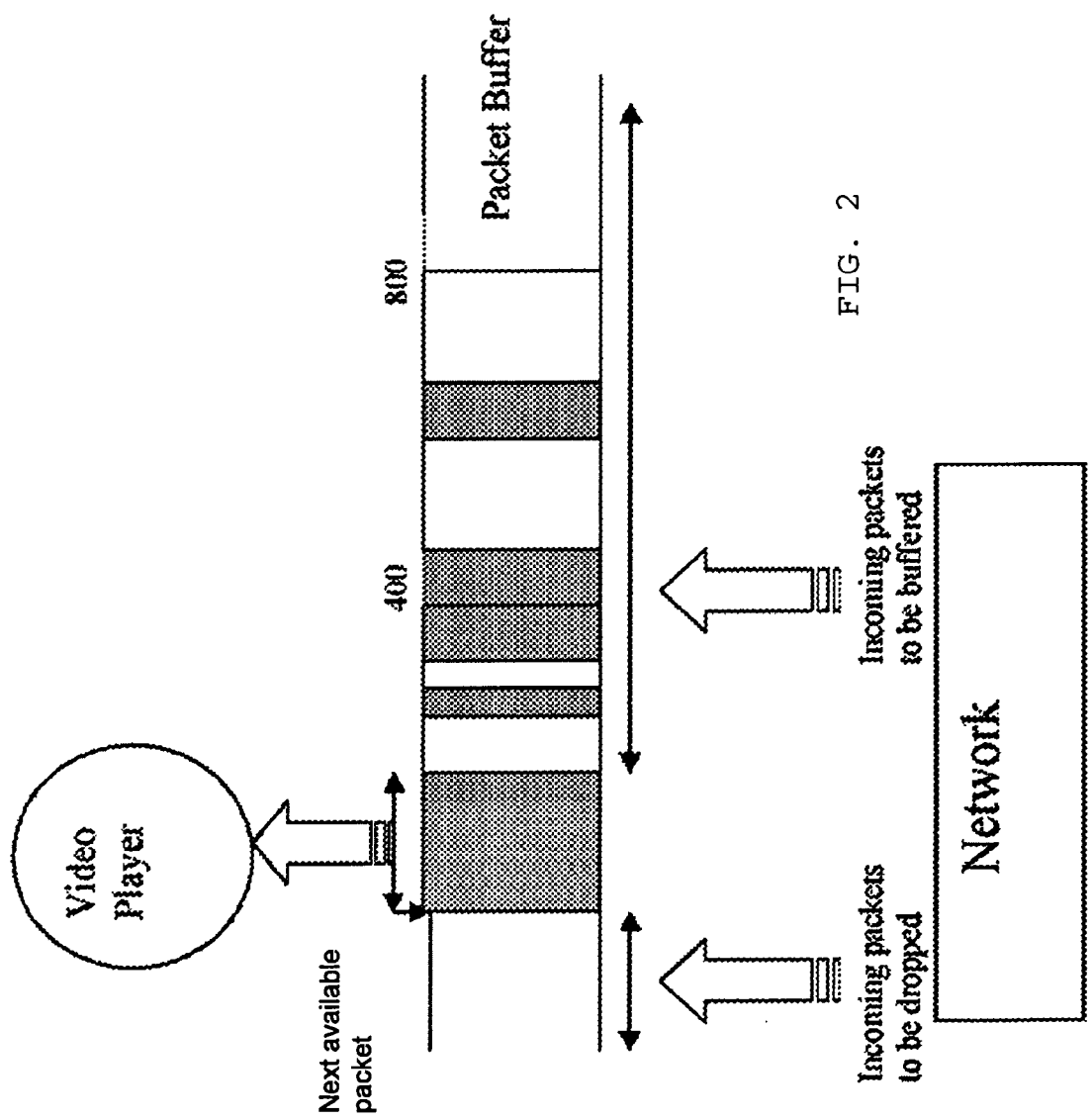
FIG. 2 is a schematic illustration of a buffer management system.
Figure 3:
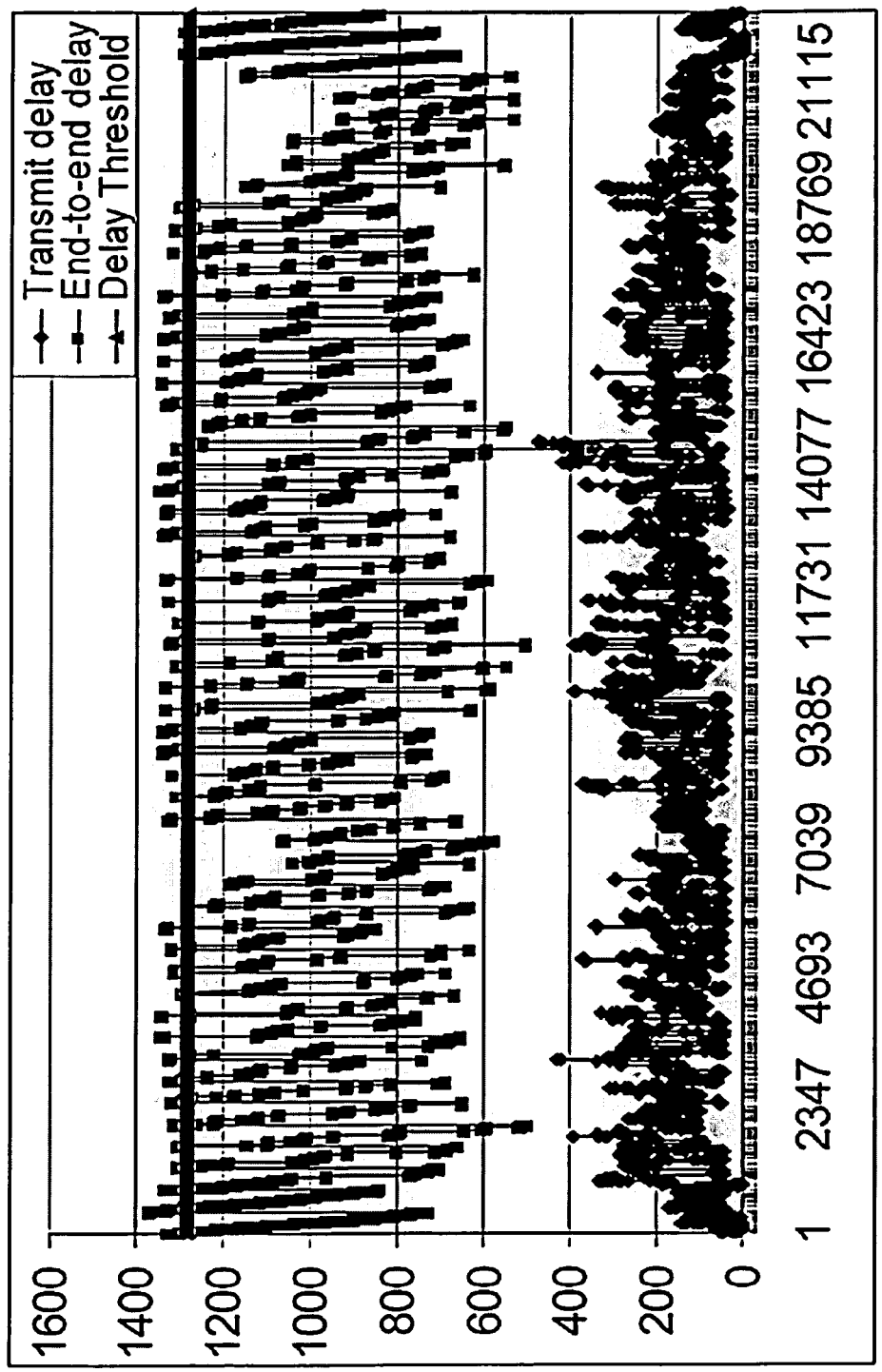
FIG. 3 is a graphic illustration of delay values for current technology (One Interface)
Figure 4:
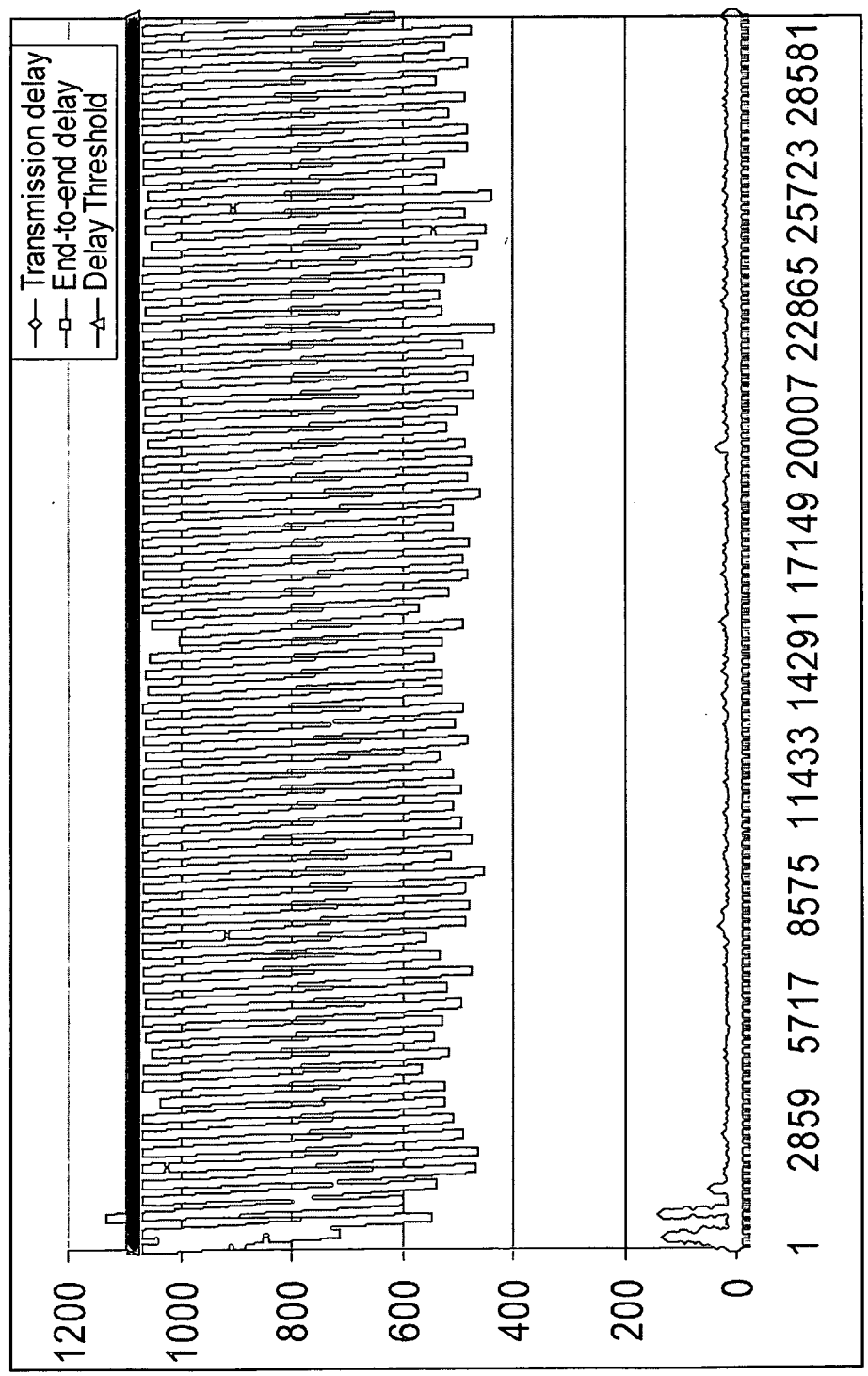
FIG. 4 is a graphic illustration of delay values for present invention Video (3 interfaces).

Targeted Systems/Network Architectures:

The proposed strategies (and the resulting architecture as given in FIG. 1) are targeted to be used by devices with multiple interfaces. The most suitable network architecture is the single sender single receiver architecture, which happens to be the most common in today's Internet. The strategies may be applicable for multicast scenarios (single sender, multiple receivers) and multiple sender single receiver scenarios as well, with appropriate changes to the strategies and architecture.

The most important elements needed for the system to work most desirably in the preferred embodiments are:

a) Presence of multiple interfaces (network paths) between end-hosts;

b) Software to implement the strategies at end points of the multiple paths (not necessarily at the sender and receiver machines).

Similarly, although the write-up describes only video application, the architecture can be applied to any real-time streaming application.

Performance Results:

Two metrics are chosen for now to verify and establish the performance gains achieved by the proposed mechanisms (under the present invention framework). For a given metric, performance of the proposed present invention Video system with 3 interfaces is compared with that of using a single transmission interface (current technology). Each of the 3 interfaces used in present invention system is a 54 Mbps 802.11 interface. For the single interface transmission one of the three 54 Mbps interfaces is made use of.

a) Packet Transmission Delay

Transmission delay is defined as time taken between getting the packet at the transmitter mangler to receiving the packet at receiving mangler. Average transmission delay comparison is given below.

Prior art technology: 156.5 msec
Present invention Video: 1.8 msec b) Percentage of Delayed Packets Packet is considered delayed if its end-to-end delay (transmission+buffering) is more than a fixed threshold. The threshold is given the time for which the first packet is buffered at the receiver, before being delivered to the target application.

Prior Art technology: 8%
Present invention Video: 0.08%

For both the metrics considered, the proposed present invention Video architecture performs 2 orders of magnitude (100 times) better than what the current technology can do. Such impressive performance gains will only improve as we add more interfaces to present invention video system and more when the proposed techniques are optimized.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments, (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A process of streaming digital data, using a flexible platform for discovering, selecting, executing and evaluating the most appropriate connectivity strategy, comprising:
   a) delivering streaming digital data that is split and transmitted over multiple heterogeneous interfaces from a sender to a receiver,
   b) receiving said streaming digital data from said sender,
   c) storing received streaming data in a receiver buffer,
   d) selectively re-transmitting missing data; and
   e) dynamic load balancing of transmissions of said streaming digital data across said multiple heterogeneous interfaces;
   further including said streaming digital data including packets having an interface field added by the sender indentifying the interface through which the packet is transmitted, and said receiver determining per interface metrics information taking into account said interface field and transmitting said per interface metrics information to said sender for dynamic load balancing.

2. The process of claim 1, further comprising the step of buffer management of stored received streaming data at said receiver station.

3. The process of claim 2, wherein said digital data is in packets and the step of buffer management at said receiver comprises reordering of packets coming through multiple interfaces and releasing packets to an application in a timely manner.

4. The process of claim 2, wherein said digital data is in packets and the step of buffer management at said receiver station, comprises selective re-transmission of packets to re-send delayed or lost packets in order that they can still be played-out at the receiver in a timely manner.

5. The process of claim 4, wherein said digital data is video data and said receiver releases video packets to a video player, and further comprising the step of displaying real-time streaming video at said video player.

6. The process of claim 5, wherein video data stream received at said receiver is video data that has been split into packets and are transmitted across multiple interfaces.

7. The process of claim 1, wherein said dynamic load-balancing is replicating at least one packet for transmission across a plurality of available interfaces, in a dynamic fashion responding to current network conditions and application characteristics.

8. The process of claim 1, wherein said dynamic load-balancing is an intelligent selection of ratios for splitting at least one packet belonging to a single video stream for transmission across a plurality of available interfaces, in a dynamic fashion responding to current network conditions and application characteristics.

9. The process of claim 8, wherein said digital data is in packets and packets arriving out of order at said receiver are buffered at said receiver end and re-ordered whereby they arrive at an application in a timely manner.

10. The process of claim 1, wherein said digital data is in packets and said receiver buffer includes play-out deadline data and supplies packets to a target application in a timely manner, every real-time packet being associated with a play-out deadline.

11. The process of claim 10, wherein said packets include the format information encoding/protocol headers, and said format information at the receiver is processed to determine the play-out deadline for each packet.

12. The process of claim 11, wherein said play-out deadline of each packet is a fixed value at the time at which packets are generated at said sender.

13. The process of claim 12, further comprising local clock synchronization between the sender and receiver and wherein $$T_{playout} = T_{generation} + T_{tolerance}$$

where
$T_{playout}$=Play-out times computed when the first packet is delivered to the application,
$T_{generation}$=Time packet is generated at the sender, and
$T_{tolerance}$=The tolerance time computed based on the time for which the first packet was buffered.

14. The process of claim 10, further comprising marking and time-stamping packets at the sender.

15. The process of claim 10, further comprising packet processing at the sender said packet processing including adding a custom header to each packet, said custom header signifying the interface through which the packet is to be sent.

16. The process of claim 15, wherein said process is a real-time application and said custom header further comprises a locally generated packet sequentially incremented id, a time field which indicates the local time at which the packet processing module at the sender receives the packet.

17. The process of claim 1, said digital data is in packets and said receiver buffer includes play-out deadline data and supplies packets to a target application in a timely manner, and using custom header information to compute the play-out deadline for each packet using the equation:

$$T_{playout} = T_{generation} + T_{tolerance}$$

where
$T_{playout}$=Play-out times computed when the first packet is delivered to the application,
$T_{generation}$=Time packet is generated at the sender, and
$T_{tolerance}$=The tolerance time computed based on the time for which the first packet was buffered.

18. The process of claim 17, further comprising the step of dropping buffered packets whose play-out deadlines have expired.

19. The process of claim 1, wherein said digital data is in packets and further comprising receiving multiple copies of the same packet at said receiver buffer and discarding all but one of said multiple copies of the same packet.

20. The process of claim 19, wherein said packets have custom heads that include a packet id field and comprising re-ordering packets based on said packet id field and stripping custom headers before packets are released to an application.

21. The process of claim 1, wherein said digital data is in packets and further comprising the step of re-transmitting packets from said sender buffer to said receiver buffer in accordance with the algorithm:
   a) the play-out deadline of the packet delivered last is about to expire;
   b) the number of packets of packet buffer exceeds threshold; and/or
   c) time since last packet release exceeds threshold.

22. The process of claim 1, further comprising managing said receiver buffer in accordance with at least one algorithm selected from the group comprising:

$$(CurrentTime > T_{playout} - T_{threshold2}),$$

$$(QueueLength > QL_{threshold2}),$$

$$(CurrentTime > T_{release} - T_{threshold4}), \text{ and}$$

$$(((CurrentTime > T_{playout} - T_{threshold1}) \text{ OR} \\ (QueueLength > QL_{threshoid1}) \text{ OR}$$

$$(CurrentTime > T_{release} - T_{threshold3})) \text{ AND} \\ (nextPktAvailable == 1)),$$

wherein;
  a) QueueLength is the number of packets,
  b) CurrentTime is the current time,
  c) $T_{release}$ is the time when the last set of packets were delivered,
  d) $T_{playout}$ is the play-out deadline,
  e) $T_{threshold}$ is the time at which packets must be released to be timely received at the receiver or application, and
  f) $QL_{threshold}$ is the maximum number of packets that are to be buffered,
wherein threshold values are set dynamically and control the extent of initial buffering and the frequency of packets being released.

23. A process of streaming digital data, using a flexible platform for discovering, selecting, executing and evaluating the most appropriate connectivity strategy, comprising:
  a) delivering streaming digital data from a sender to a receiver,
  b) receiving said streaming digital data from said sender,
  c) storing received streaming data in a receiver buffer,
  d) selectively re-transmitting missing data; and
  e) dynamic load balancing of transmissions of streaming digital data;
  further comprising the step of buffer management of stored received streaming data at said receiver station;
  wherein said digital data is in packets and the step of buffer management at said receiver station, comprises selective re-transmission of packets to re-send delayed or lost packets in order that they can still be played-out at the receiver in a timely manner;
  wherein said digital data is video data and said receiver releases video packets to a video player, and further comprising the step of displaying real-time streaming video at said video player;
  wherein video data stream received at said receiver is video data which has had at least one packet replicated and transmitted across multiple interfaces; and
  further including said streaming digital data including packets having an interface field added by the sender indentifying the interface through which the packet is transmitted, and said receiver determining per interface metrics information taking into account said interface field and transmitting said per interface metrics information to said sender for dynamic load balancing.

24. A process of streaming of digital data from a sender to a receiver, comprising:
  a) storing and ordering packets of digital data in a sender buffer,
  b) sending streaming digital data that is split and transmitted over multiple heterogeneous interfaces from said sender buffer to a receiver,
  c) receiving said streaming digital data from said sender,
  d) storing received streaming data in a receiver buffer,
  e) selectively re-transmitting packets,
  f) dynamic load balancing across said multiple heterogeneous interfaces of transmissions of streaming digital data packets stored in said receiver buffer having play-out deadline data and format information encoding/protocol headers,
  g) processing said format information at said receiver and determining the play-out deadline for each packet, said play-out deadline of each packet being a fixed value set at the time at which packets are generated at said sender,
  h) clock synchronizing said sender and said receiver,
  i) re-transmitting a missing packet with a given packet id from said sender buffer to said receiver when:
    1) play-out deadline of the last ordered packet is about to expire,
    2) a time-out value occurs from when the last re-transmit request was made, and/or
    3) the total number of missing packets exceeds a given threshold,
  wherein a packet is missing when the difference between the missing packet id and the most recent packet id exceeds a threshold and/or the play-out deadline of the packet immediately before said missing packet falls within a given threshold of time; and
  further including said streaming digital data including packets having an interface field added by the sender indentifying the interface through which the packet is transmitted, and said receiver determining per interface metrics information taking into account said interface field and transmitting said per interface metrics information to said sender for dynamic load balancing.

* * * * *

UNITED STATES PATENT AND TRADEMARK OFFICE
CERTIFICATE OF CORRECTION

PATENT NO. : 8,589,578 B2
APPLICATION NO. : 12/164058
DATED : November 19, 2013
INVENTOR(S) : Gopalakrishnan et al.

It is certified that error appears in the above-identified patent and that said Letters Patent is hereby corrected as shown below:

On the Title Page, Item (56), under "OTHER PUBLICATIONS", in Column 2, Line 1, delete "et al:" and insert -- et al.: --, therefor at each occurrence throughout the Other Publications.

On Title Page 2, in Item (56), under "OTHER PUBLICATIONS", in Columns 1 & 2, Lines 6-12 & 1-6, delete "Nitin Gogate et al: "Supporting Image and Video Applications in a Multihop Radio Environment Using Path Diversity and Multiple Description Coding" IEEE Transactions on Circuits and Systems for Video Technology. IEEE Service Center, Piscataway, NJ, US, vol. 12, No. 9 (Sep. 1, 2002).
El Al A A et al: "Improving Interactive Video in Ad-Hoc Networks Using Path Diversity" Mobile Ad-Hoc and Sensor Systems, 2004 IEEE International Conference O N Fort Lauderdale, FL, USA Oct. 25-27, 2004, Piscataway, NJ, USA, IEEE IS (Oct. 25, 2004).
Chen et al: "Robust Video Streaming Over Wireless LANs Using Multiple Description Transcoding and Prioritized Retransmission" Journal of Visual Communication and Image Representation, Academic Press, Inc, US, vol. 18, No. 3 (May 5, 2007).".

In the Specification

In Column 11, Line 29, delete "not will suited" and insert -- not well suited --, therefor.

In Column 13, Line 9, delete " $c_i(t) = \alpha c_i^{CURR} + (1-\alpha)c_i(t-1))$ " and insert -- $c_i(t) = \alpha c_i^{CURR} + (1-\alpha)c_i(t-1)$ --, therefor.

In the Claims

In Column 16, Line 22, in Claim 17, delete "said digital" and insert -- wherein said digital --, therefor.

Signed and Sealed this
Seventh Day of April, 2015

Michelle K. Lee
*Director of the United States Patent and Trademark Office*